(12) United States Patent
    Shi

(10) Patent No.: US 11,115,357 B2
(45) Date of Patent: Sep. 7, 2021

(54) METHOD, A DEVICE AND A STORAGE MEDIUM OF FORWARDING VOICE INFORMATION IN INSTANT MESSAGING

(71) Applicant: SHANGHAI ZHANGMEN SCIENCE AND TECHNOLOGY CO., LTD., Shanghai (CN)

(72) Inventor: Tiyuan Shi, Shanghai (CN)

(73) Assignee: SHANGHAI ZHANGMEN SCIENCE AND TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/824,723

(22) Filed: Mar. 20, 2020

(65) Prior Publication Data
    US 2020/0220824 A1    Jul. 9, 2020

Related U.S. Application Data

(63) Continuation of application No. PCT/CN2018/101492, filed on Aug. 21, 2018.

(51) Int. Cl.
    *G06F 15/16*    (2006.01)
    *H04L 12/58*    (2006.01)
    *H04M 1/72433*  (2021.01)

(52) U.S. Cl.
    CPC .......... *H04L 51/046* (2013.01); *H04L 51/043* (2013.01); *H04L 51/16* (2013.01); *H04M 1/72433* (2021.01)

(58) Field of Classification Search
    CPC ..... H04L 51/046; H04L 51/043; H04L 51/16; H04L 51/32; H04L 51/04; H04L 51/10; H04M 1/7255
    See application file for complete search history.

(56) References Cited

U.S. PATENT DOCUMENTS

| 2005/0114533 | A1* | 5/2005 | Hullfish | H04L 51/04 709/230 |
| 2005/0135333 | A1* | 6/2005 | Rojas | H04M 7/006 370/352 |
| 2007/0112925 | A1* | 5/2007 | Malik | H04M 3/533 709/206 |
| 2007/0226367 | A1* | 9/2007 | Cai | H04L 51/14 709/238 |
| 2008/0177840 | A1* | 7/2008 | Grigoriev | G06Q 20/386 709/206 |

(Continued)

FOREIGN PATENT DOCUMENTS

| CN | 103138962 A | 6/2013 |
| CN | 105812236 A | 7/2016 |

(Continued)

*Primary Examiner* — Cheikh T Ndiaye
(74) *Attorney, Agent, or Firm* — Kilpatrick Townsend & Stockton LLP

(57) ABSTRACT

Disclosed herein are a method, a device and a storage medium of forwarding voice information in instant messaging. The method comprises: acquiring voice information to be forwarded and a receiving user which are selected by a sending user; if it is determined that the voice information to be forwarded is voice information inputted by the sending user, forwarding the voice information to be forwarded to the receiving user. The forwarding efficiency can be increased by applying the technical solution of the present invention.

12 Claims, 6 Drawing Sheets

(56) References Cited

U.S. PATENT DOCUMENTS

| | | | | |
|---|---|---|---|---|
| 2010/0004010 A1* | 1/2010 | Shin | ......................... | H04L 51/04 |
| | | | | 455/466 |
| 2012/0077467 A1* | 3/2012 | Fan | ......................... | H04W 4/24 |
| | | | | 455/414.1 |
| 2012/0275578 A1* | 11/2012 | Othmer | ............. | H04M 3/53333 |
| | | | | 379/88.14 |
| 2017/0310811 A1* | 10/2017 | Zhong | ..................... | H04L 51/10 |

FOREIGN PATENT DOCUMENTS

| | | |
|---|---|---|
| CN | 106487666 A | 3/2017 |
| CN | 106506346 A | 3/2017 |
| CN | 206164855 U | 5/2017 |
| CN | 107888478 A | 4/2018 |

\* cited by examiner

METHOD, A DEVICE AND A STORAGE MEDIUM OF FORWARDING VOICE INFORMATION IN INSTANT MESSAGING

CROSS REFERENCE TO THE RELATED APPLICATION

This application is the continuation application of International Application No. PCT/CN2018/101492, filed on Aug. 21, 2018, which is based upon and claims priority to Chinese Patent Application No. 201710867045.2, filed on Sep. 22, 2017, the entire contents of which are incorporated herein by reference.

FIELD

The present invention relates to computer application technologies, and more specifically relates to a method, a device and a storage medium of forwarding voice information in instant messaging.

BACKGROUND

Due to consideration of possible privacy violations, currently many instant messaging (IM) applications do not support users to directly forward voice information, such as WeChat.

If users want to forward voice information, they need to go through complicated operations. For example, the user needs to collect the voice information to be forwarded first, and then add and send the collected voice information in a chat window of the receiving user to complete forwarding of the voice information.

It can be seen that the foregoing manner of forwarding voice information is cumbersome to implement, thereby reducing forwarding efficiency.

SUMMARY

In view of this, the present invention provides a method, a device, and a storage medium of forwarding voice information in instant messaging, which can improve forwarding efficiency.

The technical solution is specifically provided as follows.

A method of forwarding voice information in instant messaging, comprises:

acquiring voice information to be forwarded and a receiving user which are selected by a sending user;

if it is determined that the voice information is voice information inputted by the sending user, forwarding the voice information to the receiving user.

According to one embodiment of the present invention, acquiring the voice information to be forwarded and the receiving user which are selected by the sending user, comprises:

acquiring, by a first terminal device, the voice information to be forwarded and the receiving user which are selected by the sending user, wherein the first terminal device is a terminal device used by the sending user;

if it is determined that the voice information is voice information inputted by the sending user, forwarding the voice information to the receiving user, comprises:

determining, by the first terminal device, whether the voice information is voice information inputted by the sending user;

if yes, sending the voice information and the receiving user to an instant messaging (IM) platform so that the IM platform sends the voice information to the receiving user.

According to one embodiment of the present invention, the method further comprises:

if it is determined, by the first terminal device, that the voice information is not voice information inputted by the sending user, feedbacking prompt information indicating that forwarding voice information of other users is prohibited to the sending user.

According to one embodiment of the present invention, determining, by the first terminal device, whether the voice information is voice information inputted by the sending user, comprises:

determining, by the first terminal device, whether the voice information is voice information inputted by the sending user according to an information generator parameter carried in the voice information.

According to one embodiment of the present invention, the method further comprises:

before determining whether the voice information is voice information inputted by the sending user, determining, by the first terminal device, whether voice forwarding function is on, and if yes, further determining whether the voice information is voice information inputted by the sending user.

According to one embodiment of the present invention, acquiring the voice information to be forwarded and the receiving user which are selected by the sending user, comprises:

receiving, by an instant messaging (IM) platform, the voice information to be forwarded and the receiving user which are selected by the sending user and are sent by the first terminal device, wherein the first terminal device is a terminal device used by the sending user;

if it is determined that the voice information is voice information inputted by the sending user, forwarding the voice information to the receiving user, comprises:

determining, by the IM platform, whether the voice information is voice information inputted by the sending user;

if yes, sending the voice information to the receiving user.

According to one embodiment of the present invention, the method further comprises:

if it is determined by the IM platform that the voice information is not voice information inputted by the sending user, returning prompt information indicating that forwarding voice information of other users is prohibited to the first terminal device so that the first terminal device feedbacks the prompt information to the sending user.

According to one embodiment of the present invention, determining, by the IM platform, whether the voice information is voice information inputted by the sending user, comprises:

determining, by the IM platform, whether the voice information is voice information inputted by the sending user according to an information generator parameter carried in the voice information.

According to one embodiment of the present invention, the method further comprises:

before sending the voice information to be forwarded and the receiving user which are selected by the sending user to the IM platform, determining, by the first terminal device, whether voice forwarding function is on, and if yes, sending the voice information to be forwarded and the receiving user which are selected by the sending user to the IM platform.

According to one embodiment of the present invention, the method further comprises:

receiving, by a second terminal device used by the receiving user, the voice information and presenting the voice information in a chat window of the receiving user with the sending user.

A computer device, comprising a memory, a processor and computer programs stored on the memory and executable on the processor, wherein the computer programs, when executed by the processor, implement the above mentioned methods.

A computer readable storage medium storing computer programs thereon, wherein the computer programs, when executed by a processor, implement the above mentioned methods.

It can be seen from the above introduction that the technical solution of the present invention comprises acquiring voice information to be forwarded and a receiving user which are selected by a sending user; determining whether the voice information to be forwarded is voice information inputted by the sending user; if yes, forwarding the voice information to be forwarded to the receiving user. For users who want to forward voice information, they only need to select voice information to be forwarded and a receiving user, the voice information to be forwarded will be subsequently forwarded to the receiving user automatically. Compared with the prior art, the technical solution of the present invention simplifies user operations and improves forwarding efficiency. In addition, the technical solution of the present invention merely supports forwarding voice information inputted by the user himself/herself, thereby implementing an effective balance between user privacy protection and user operation convenience, improving user stickiness of social products.

DESCRIPTIONS OF THE DRAWINGS

DETAILED EMBODIMENTS

It is with respect to the problems existing in the prior art that a technical solution of forwarding voice information in instant messaging is proposed in the present invention to improve forwarding efficiency.

In order to make the technical solution of the present invention more clear, the technical solution of the present invention is described below with reference to the accompanying drawings and examples.

Obviously, the described embodiments are a part of embodiments of the present invention, but not all the embodiments. Based on the embodiments of the present invention, all other embodiments obtained by those skilled in the art without making creative labor belong to the protection scope of the present invention.

Figure 1:
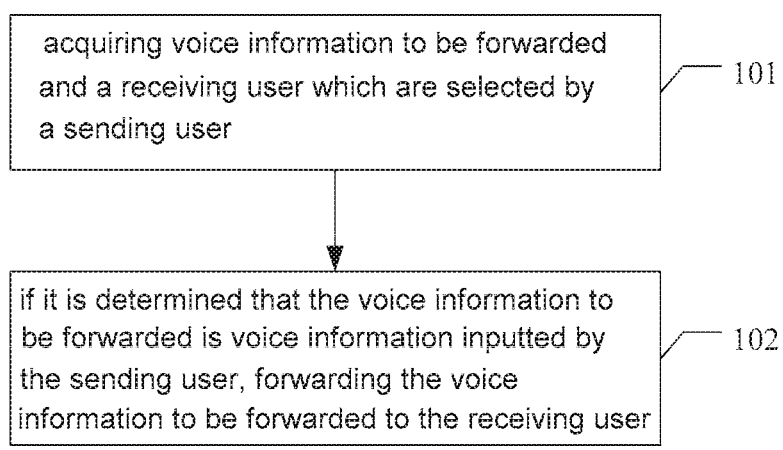
FIG. 1 is a flowchart of a first embodiment of a method of forwarding voice information in instant messaging of the present invention.

FIG. 1 is a flowchart of a first embodiment of a method of forwarding voice information in instant messaging of the present invention. As illustrated in FIG. 1, the following specific implementations are included.

At 101, voice information to be forwarded and a receiving user which are selected by a sending user is acquired.

At 102, if it is determined that the voice information to be forwarded is voice information inputted by the sending user, the voice information to be forwarded is forwarded to the receiving user.

In practical applications, forwarding of voice information mainly involve network devices such as a first terminal device, an IM platform and a second terminal device. The first terminal device is a terminal device used by the sending user. The second terminal device is a terminal device used by the receiving user. The first terminal device and the second terminal device may be intelligent devices such as cell phones used by the users.

There is no limitation on how the sending user selects the voice information to be forwarded and the receiving user, which can be determined according to actual needs.

In an example, the sending user may press and hold the voice information to be forwarded. Correspondingly, a list of options may be presented for the sending user, which may include options such as "send to friends", "delete", etc. If the sending user selects an option of "send to friends", contacts list information may be further presented from which the sending user may select as the receiving user for the voice information to be forwarded.

Further, the sending user may perform the forwarding of the selected voice information, such as clicking "send".

The above operations of the sending user may be performed at the first terminal device.

The first terminal device may first determine whether the voice information to be forwarded is voice information inputted by the sending user after acquiring the voice information to be forwarded and the receiving user which are selected by the sending user. If yes, the voice information to be forwarded and the receiving user may be sent to the IM platform. Then the IM platform sends the voice information to be forwarded to the receiving user to implement forwarding of voice information.

Or the first terminal device may send the voice information to be forwarded and the receiving user which are selected by the sending user to the IM platform after acquiring the voice information to be forwarded and the receiving user, and the IM platform determines whether the voice information to be forwarded is voice information inputted by the sending user. If yes, the voice information to be forwarded may be sent to the receiving user to implement forwarding of voice information.

Which of the above methods is specifically adopted may be determined according to actual needs.

For the sending user, he/she only needs to select voice information to be forwarded and a receiving user, the voice information to be forwarded will be subsequently forwarded to the receiving user automatically, regardless of which of the above methods is adopted. Compared with the prior art, the technical solution of the present invention simplifies user operations and improves forwarding efficiency.

In addition, after determining the voice information to be forwarded is not voice information inputted by the sending user, either the first terminal device or the IM platform will feedback prompt information indicating that forwarding voice information of other users is prohibited to the sending user.

That is to say, the technical solution of the present invention merely supports forwarding voice information inputted by the sending user himself/herself (voice information spoken by the sending user), thereby implementing an effective balance between user privacy protection and user operation convenience, improving user stickiness of social products.

Further, the user may select to turn on or turn off voice forwarding function. Correspondingly, the first terminal device may first determine whether the voice forwarding function is on after acquiring the voice information to be forwarded and the receiving user which are selected by the sending user. If yes, it can be further determined whether the voice information to be forwarded is voice information inputted by the sending user. Or the voice information to be forwarded and the receiving user which are selected by the sending user are further sent to the IM platform and the IM platform determines whether the voice information to be forwarded is voice information inputted by the sending user.

If the voice forwarding function is off, the user may be queried whether to turn on the function.

In this way, the sending user may flexibly select to turn on or turn off voice forwarding function according to his/her needs, thereby facilitating user's operation.

Figure 2:
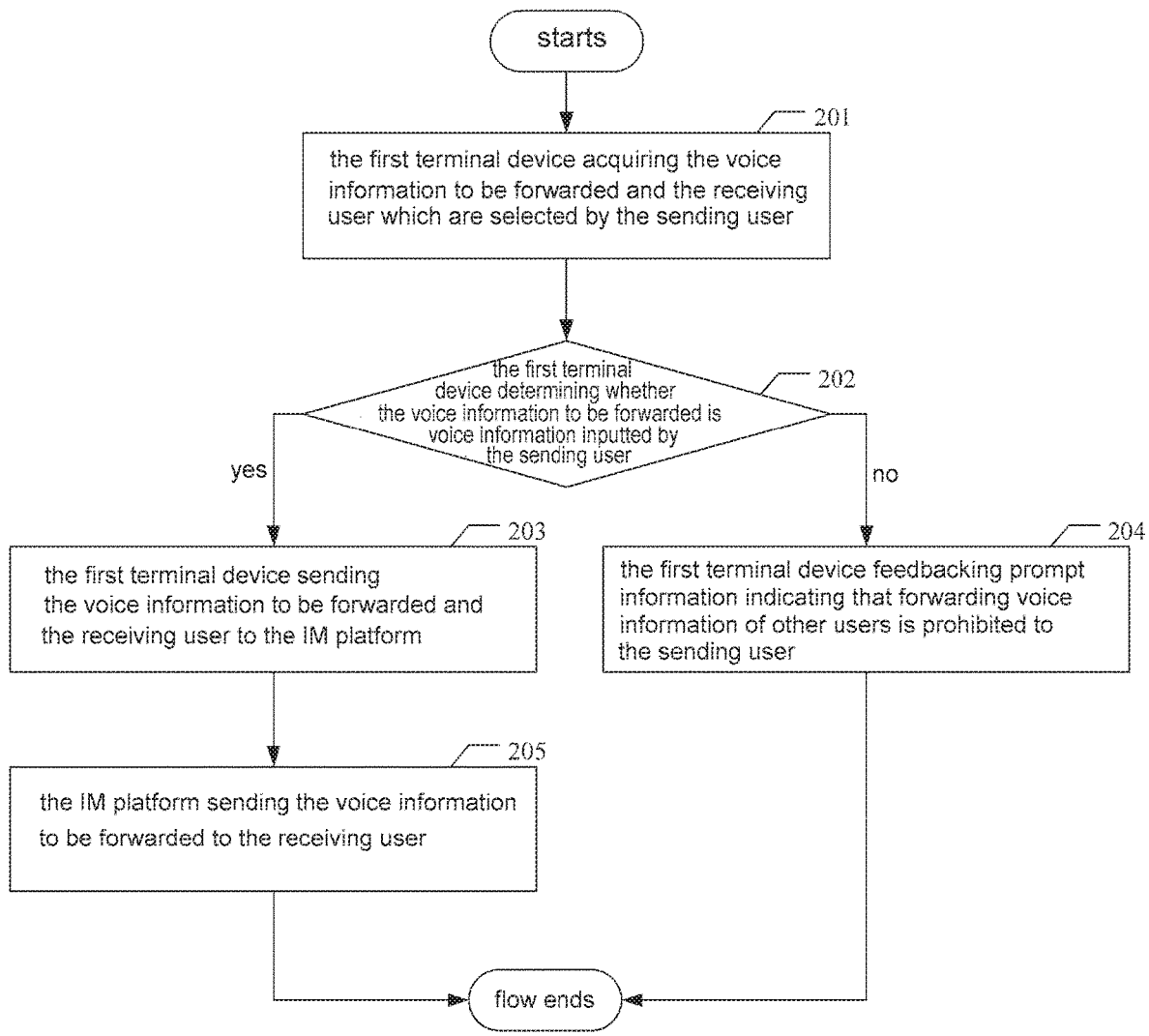
FIG. 2 is a flowchart of a second embodiment of a method of forwarding voice information in instant messaging of the present invention.

Based on the above introduction, FIG. 2 is a flowchart of a second embodiment of a method of forwarding voice information in instant messaging of the present invention. As illustrated in FIG. 2, the following specific implementations are included.

At 201, the first terminal device acquires the voice information to be forwarded and the receiving user which are selected by the sending user.

As described above, the first terminal device is a terminal device used by the sending user, such as a cell phone.

The sending user selects the voice information to be forwarded and the receiving user, and performs forwarding of the voice information to be forwarded, such as clicking "send".

At 202, the first terminal device determines whether the voice information to be forwarded is voice information inputted by the sending user. If yes, 203 is performed; otherwise, 204 is performed.

Each piece of voice information may carry one or more information parameters, which may include an information generator parameter.

Correspondingly, the first terminal device may determine whether the voice information to be forwarded is voice information inputted by the sending user according to an information generator parameter carried in the voice information to be forwarded.

At 203, the first terminal device sends the voice information to be forwarded and the receiving user to the IM platform and then 205 is performed.

The first terminal device may send an information forwarding request, which may carry the voice information to be forwarded and the receiving user, to the IM platform.

The flow ends after first terminal device feedbacks prompt information indicating that forwarding voice information of other users is prohibited to the sending user at 204.

In the present embodiment, only voice information inputted by the sending user himself/herself is allowed to be forwarded. If the sending user requests to forward voice information of other users, prompt information indicating that forwarding voice information of other users is prohibited will be feedback to the sending user to indicate to the sending user that the operation is not allowed.

There is no limitation on subsequent operations of the sending user.

The flow ends after the IM platform sends the voice information to be forwarded to the receiving user at 205.

The second terminal device used by the receiving user may present the voice information in a chat window of the receiving user with the sending user after receiving the voice information sent by the IM platform, and subsequently the receiving user may listen to the presented voice information.

Figure 3:
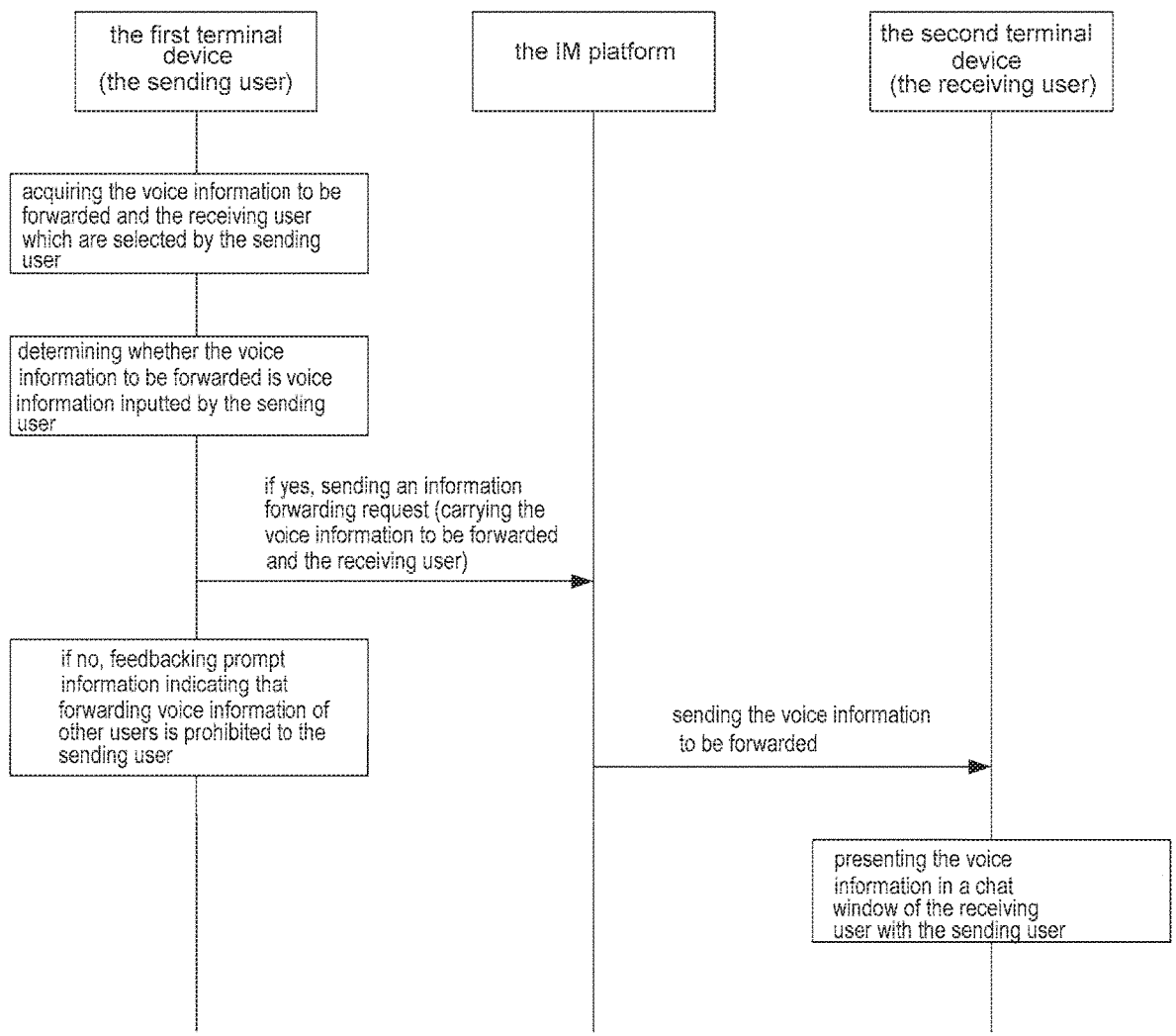
FIG. 3 is a schematic diagram of a first way of interaction between a first terminal device, an IM platform and a second terminal device of the present invention.

Based on the introduction in the embodiment shown in FIG. 2, FIG. 3 is a schematic diagram of a first way of interaction between the first terminal device, the IM platform and the second terminal device of the present invention.

As illustrated in FIG. 3, operations are performed by the devices respectively as follows.

The first terminal device: acquiring the voice information to be forwarded and the receiving user which are selected by the sending user and determining whether the voice information to be forwarded is voice information inputted by the sending user; if yes, forwarding an information forwarding request, which carries the voice information to be forwarded and the receiving user, to the IM platform; if no, feedbacking prompt information indicating that forwarding prompt information of other users is prohibited to the sending user.

The IM platform: receiving an information forwarding request sent by the first terminal device and sending the voice information to be forwarded to the second terminal device.

The second terminal device: receiving voice information sent by the IM platform and presenting the received voice information in a chat window of the receiving user with the sending user.

Figure 4:
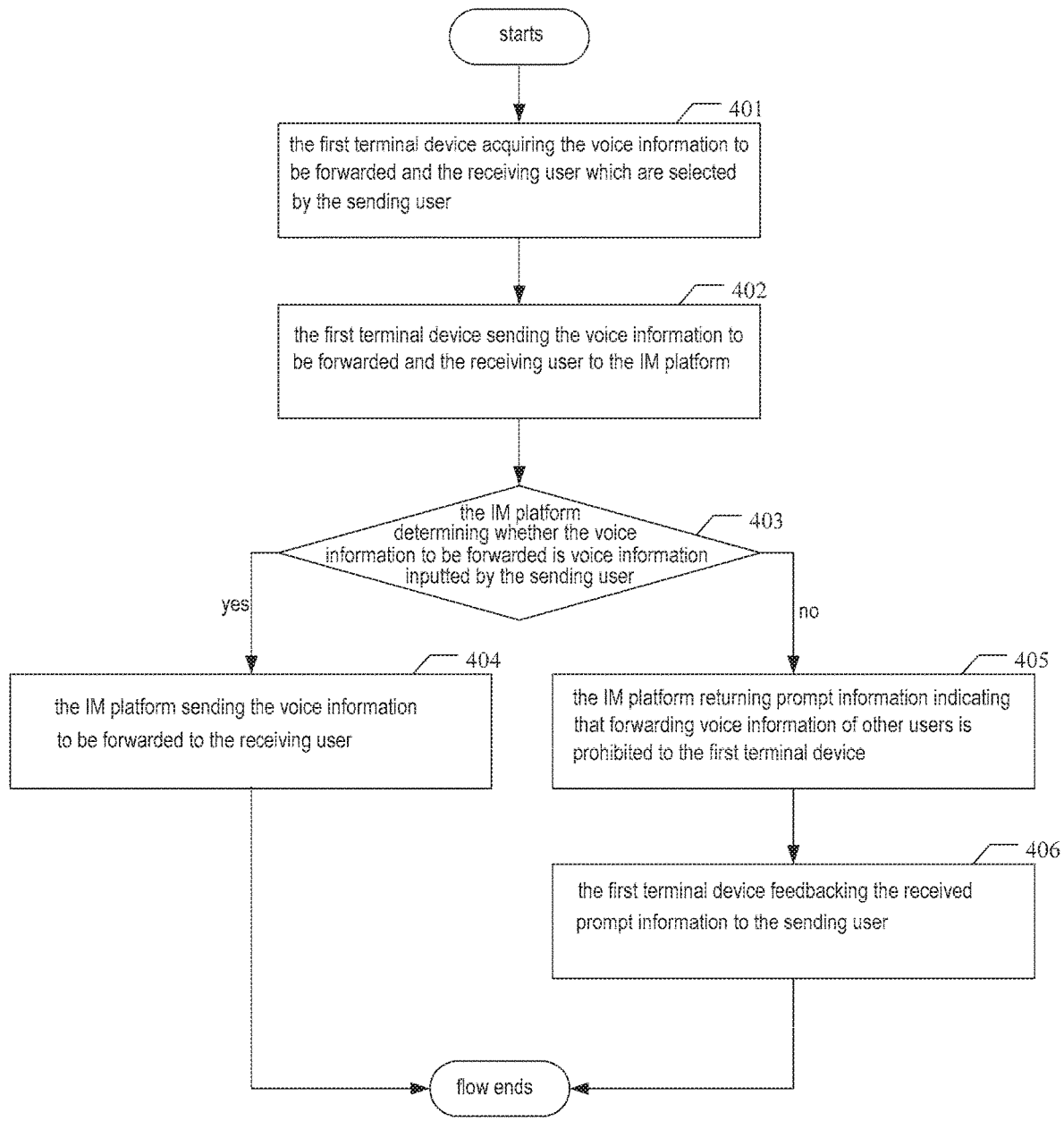
FIG. 4 is a flowchart of a third embodiment of a method of forwarding voice information in instant messaging of the present invention.

FIG. 4 is a flowchart of a third embodiment of a method of forwarding voice information in instant messaging of the present invention. As illustrated in FIG. 4, the following specific implementations are included.

At 401, the first terminal device acquires the voice information to be forwarded and the receiving user which are selected by the sending user.

The sending user selects the voice information to be forwarded and the receiving user, and performs forwarding of the voice information to be forwarded, such as clicking "send".

At 402, the first terminal device sends the voice information to be forwarded and the receiving user to the IM platform.

The first terminal device may send an information forwarding request, which may carry the voice information to be forwarded and the receiving user, to the IM platform.

At 403, the IM platform determines whether the voice information to be forwarded is voice information inputted by the sending user. If yes, 404 is performed; otherwise, 405 is performed.

Each piece of voice information may carry one or more information parameters, which may include an information generator parameter.

Correspondingly, the IM platform may determine whether the voice information to be forwarded is voice information inputted by the sending user according to an information generator parameter carried in the voice information to be forwarded.

The flow ends after the IM platform sends the voice information to be forwarded to the receiving user at 404.

The second terminal device used by the receiving user may present the voice information in a chat window of the receiving user with the sending user after receiving the voice information sent by the IM platform, and subsequently the receiving user may listen to the presented voice information.

At 405, the IM platform returns prompt information indicating that forwarding voice information of other users is prohibited to the first terminal device.

The flow ends after the first terminal device feedbacks the received prompt information to the sending user at 406.

In the present embodiment, only voice information inputted by the sending user himself/herself is allowed to be forwarded. If the sending user requests to forward voice information of other users, prompt information indicating that forwarding voice information of other users is prohibited will be feedback to the sending user to indicate to the sending user that the operation is not allowed.

Figure 5:
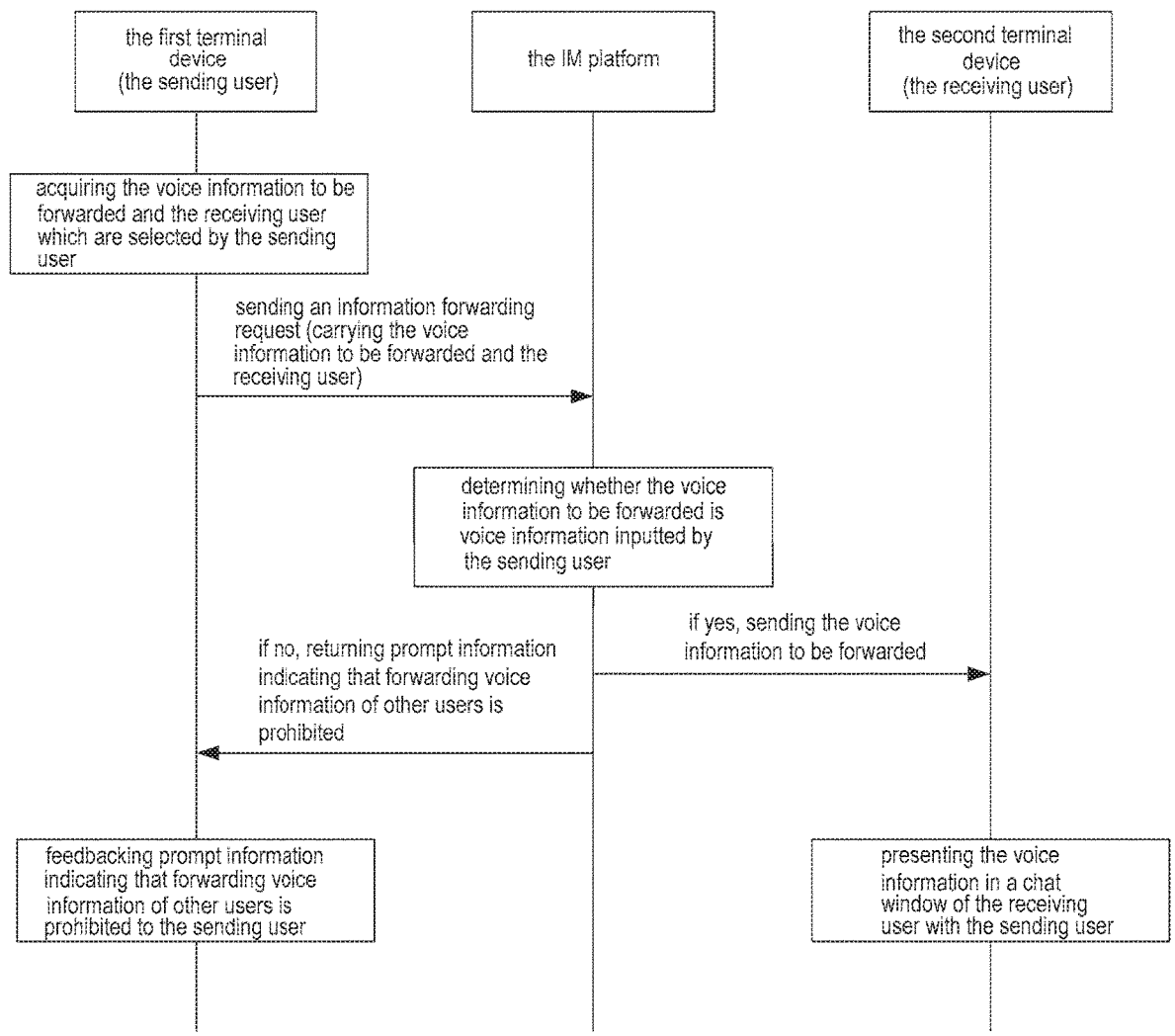
FIG. 5 is a schematic diagram of a second way of interaction between the first terminal device, the IM platform and the second terminal device of the present invention.

Based on the introduction in the embodiment shown in FIG. 4, FIG. 5 is a schematic diagram of a second way of interaction between the first terminal device, the IM platform and the second terminal device of the present invention.

As illustrated in FIG. 5, operations are performed by the devices respectively as follows.

The first terminal device: acquiring the voice information to be forwarded and the receiving user which are selected by the sending user, and sending the voice information to be forwarded and the receiving user carried in an information forwarding request to the IM platform; if the voice information to be forwarded is not voice information inputted by the sending user, receiving prompt information indicating that forwarding voice information of other users is prohibited returned by the IM platform, and feedbacking the prompt information to the sending user;

The IM platform: receiving an information forwarding request sent by the first terminal device and determining the voice information to be forwarded is voice information inputted by the sending user; if yes, sending the voice information to be forwarded to the second terminal device; if no, returning prompt information indicating that forwarding voice information of other users is prohibited to the first terminal device.

The second terminal device: receiving voice information sent by the IM platform and presenting the received voice information in a chat window of the receiving user with the sending user.

It should be noted that, for the foregoing method embodiments, for simplicity of description, they are all described as a series of action combinations, but it should be appreciated by those skilled in the art that the present invention is not limited by the described action order. According to the present invention, certain steps may be performed in another order or simultaneously. Secondly, it should also be appreciated by those skilled in the art that the embodiments described in the specification are all preferred embodiments, and the actions and modules involved are not necessarily required by the present invention.

In the above embodiments, the description of each embodiment has its own emphasis. For a part that is not described in detail in an embodiment, reference may be made to related descriptions in other embodiments.

In summary, by using the technical solution of the above method embodiments, for users who want to forward voice information, they only need to select voice information to be forwarded and a receiving user, the voice information to be forwarded will be subsequently forwarded to the receiving user automatically. Compared with the prior art, the technical solution of the present invention simplifies user operations and improves forwarding efficiency. In addition, the technical solution of the above method embodiments merely supports forwarding voice information inputted by the user himself/herself, thereby implementing an effective balance between user privacy protection and user operation convenience, improving user stickiness of social products.

Figure 6:
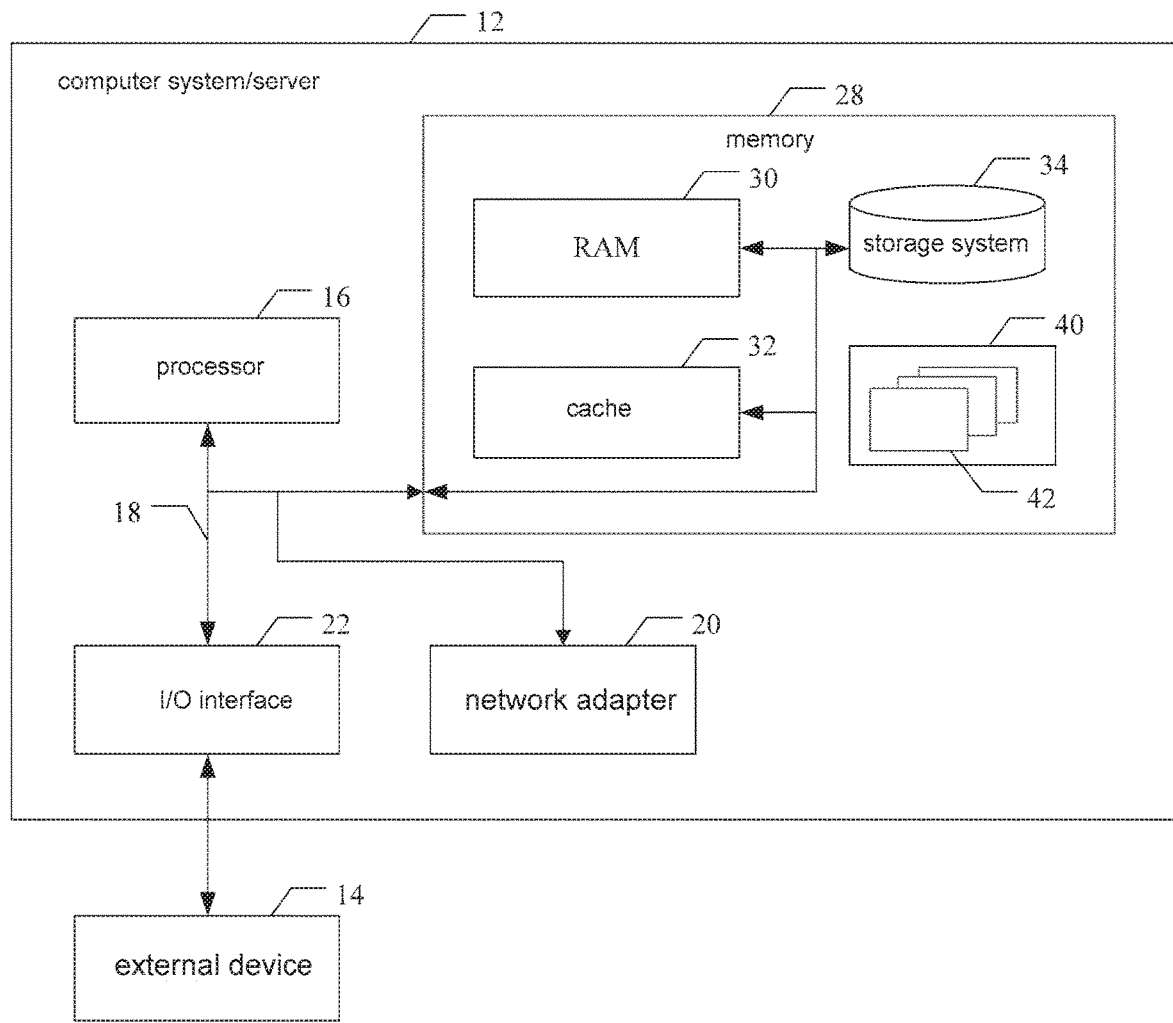
FIG. 6 shows a block diagram of an exemplary computer system/server 12 suitable for implementing the embodiments of the present invention.

FIG. 6 shows a block diagram of an exemplary computer system/server 12 suitable for implementing the embodiments of the present invention. The computer system/server 12 shown in FIG. 6 is merely an example, and should not impose any limitation on the functions and scope of use of the embodiments of the present application.

As shown in FIG. 6, the computer system/server 12 is embodied as a general-purpose computing device. Components of the computer system/server 12 may include but are not limited to one or more processors (processing units) 16, a memory 28, a bus 18 connecting different system components (including the memory 28 and the processor 16).

The bus 18 represents one or more of several types of bus structures, including a memory bus or a memory controller, a peripheral bus, a graphics acceleration port, a processor, or a local area bus using any of a variety of bus structures. By way of example, these architectures include, but are not limited to, an Industry Standard Architecture (ISA) bus, a Micro Channel Architecture (MAC) bus, an enhanced ISA bus, a Video Electronics Standards Association (VESA) local area bus, and a peripheral component interconnect (PCI) bus.

Computer system/server 12 typically includes a variety of computer system readable media. These media can be any available media that can be accessed by the computer system/server 12, including volatile and non-volatile media, removable and non-removable media.

The memory 28 may include computer system readable media in the form of a volatile memory, such as a random access memory (RAM) 30 and/or a cache memory 32. Computer system/server 12 may further include other removable/non-removable, volatile/nonvolatile computer system storage media. By way of example only, the storage system 34 may be used to read and write non-removable, non-volatile magnetic media (not shown in FIG. 6 and is commonly referred to as a "hard drive"). Although not shown in FIG. 6, a magnetic disk drive for reading and writing to a removable non-volatile magnetic disk (for example, "a floppy disk") and an optical disk drive for reading and writing to a removable non-volatile optical disk (for example, CD-ROM, DVD-ROM or other optical media) may be provided. In these cases, each drive may be connected to the bus 18 through one or more data media interfaces. The memory 28 may include at least one program product having a set of (e.g., at least one) program modules configured to perform the functions of the embodiments of the present invention.

A program/utility tool 40 having a set of (at least one) program modules 42 may be stored in, for example, the memory 28. Such program modules 42 include, but are not limited to, an operating system, one or more application programs, other programs modules and program data, each or some combination of these examples may include implementations of the network environment. The program module 42 generally performs functions and/or methods in the embodiments described in the present invention.

The computer system/server 12 can also communicate with one or more external devices 14 (e.g., a keyboard, a pointing device, a display 24, etc.), and can also communicate with one or more devices that enable users to interact with the computer system/server 12, and/or with any device (such as a network card, a modem, etc.) that enables the computer system/server 12 to communicate with one or more other computing devices. Such communication can be performed through an input/output (I/O) interface 22. Moreover, the computer system/server 12 can also communicate with one or more networks (such as a local area network (LAN), a wide area network (WAN), and/or a public network, such as the Internet) through a network adapter 20. As shown in FIG. 6, the network adapter 20 communicates with other modules of the computer system/server 12 through the bus 18. It should be understood that although not shown in the figure, other hardware and/or software modules may be used in conjunction with the computer system/server 12, including but not limited to: microcode, device drivers, redundant processing units, external disk drive arrays, RAID systems, tape drives and data backup storage systems.

The processor 16 executes various functional applications and data processing by running a program stored in the memory 28, for example, implementing the method in the embodiment shown in FIG. 1, 2, or 4, i.e., acquiring and sending the voice information to be forwarded and the receiving user which are selected by the sending user, and if it is determined that the voice information to be forwarded is voice information inputted by the sending user, forwarding the voice information to be forwarded to the receiving user.

For specific implementation, reference is made to related descriptions in the foregoing embodiments, and details are not described herein again.

It is also disclosed a computer-readable storage medium storing computer programs thereon in the present invention, wherein the programs, when executed by a processor, implement the method in the embodiment shown in FIG. 1, 2 or 4.

Any combination of one or more computer-readable media may be used. The computer-readable medium may be a computer-readable signal medium or a computer-readable storage medium. More specific examples (non-exhaustive list) of computer-readable storage media may include: portable computer magnetic disks, hard disks, a random access memory (RAM), a read-only memory (ROM), an erasable programming read-only memory (EPROM or flash memory), a portable compact disk read-only memory (CD-ROM), an optical storage device, a magnetic storage device, or any suitable combination of the foregoing. In the present document, a computer-readable storage medium may be any tangible medium that contains or stores a program that can be used by or in combination with an instruction execution system, apparatus, or device.

A computer-readable signal medium may include a data signal that is included in a baseband or propagated as part of a carrier wave, and which carries computer-readable program code. Such a propagated data signal may take many forms, including but not limited to electromagnetic signals, optical signals, or any suitable combination of the foregoing. The computer-readable signal medium may also be any computer-readable medium other than a computer-readable storage medium, and the computer-readable medium may send, propagate, or transmit a program for use by or in connection with an instruction execution system, apparatus, or device.

Program code embodied on a computer-readable medium may be transmitted using any appropriate medium, including but not limited to: wireless, wired, optical fiber cable, RF, etc., or any suitable combination of the foregoing.

Computer program code for performing the operations of the present invention may be written in one or more programming languages, or a combination thereof, including object oriented programming languages such as Java, Smalltalk, C++, and conventional procedural programming language, such as "C" or similar programming language. The program code can be executed entirely on the user's computer, partly on the user's computer, as an independent software package, partly on the user's computer and partly on a remote computer, or entirely on a remote computer or server. In the case of a remote computer, the remote computer can be connected to the user's computer through any kind of network, including a local area network (LAN) or wide area network (WAN), or it can be connected to an external computer (for example through Internet connection provided by an Internet service provider).

In the several embodiments provided by the present invention, it should be understood that the disclosed devices and methods may be implemented in other ways. By way of example, the device embodiments described above are merely schematic. For example, the division of the units is only a logical function division, and there may be another division manner in actual implementation.

The units described as separate components may or may not be physically separated, and the components displayed as units may or may not be physical units. They may be located in one place, or may be distributed on multiple network units. Some or all of the units may be selected according to actual needs to achieve the objective of the solution of this embodiment.

In addition, each functional unit in the embodiments of the present invention may be integrated into one processing unit, or each unit may exist separately physically, or two or more units may be integrated into one unit. The above integrated unit may be implemented in the form of hardware, or in the form of hardware plus software functional units.

The integrated unit implemented in the form of a software functional unit may be stored in a computer-readable storage medium. The above software functional unit is stored in a storage medium and includes several instructions for causing a computer device (which may be a personal computer, a server, or a network device) or a processor to execute some steps of the methods described in the embodiments of the present invention. The foregoing storage medium includes various media that can store program codes, such as a U disk, a mobile hard disk, a read-only memory (ROM), a random access memory (RAM), a magnetic disk, or an optical disc.

The above are only preferred embodiments of the present invention, and are not intended to limit the present invention. Any modification, equivalent replacement, and improvement made within the spirit and principle of the present invention should be included in the protection scope of the present invention.

What is claimed is:

1. A method of forwarding voice information in instant messaging, the method comprising:
    acquiring voice information to be forwarded and a receiving user which are selected by a sending user;
    in response to determining that the voice information is voice information inputted by the sending user, forwarding the voice information to the receiving user; and
    in response to determining that the voice information is not voice information inputted by the sending user, feedbacking prompt information indicating that forwarding voice information from other users is prohibited to the sending user.

2. The method according to claim 1, wherein
the step of acquiring the voice information to be forwarded and the receiving user which are selected by the sending user, comprising:
acquiring, by a first terminal device, the voice information to be forwarded and the receiving user which are selected by the sending user, wherein the first terminal device is a terminal device used by the sending user;
the step of in response to determining that the voice information is voice information inputted by the sending user, forwarding the voice information to the receiving user, comprising:
determining, by the first terminal device, whether the voice information is voice information inputted by the sending user;
if yes, sending the voice information and the receiving user to an instant messaging (IM) platform so that the IM platform sends the voice information to the receiving user.

3. The method according to claim 2, wherein
the step of in response to determining that the voice information is not voice information inputted by the sending user, feedbacking prompt information indicating that forwarding voice information from other users is prohibited to the sending user comprising:
in response to determining, by the first terminal device, that the voice information is not voice information inputted by the sending user, feedbacking prompt information indicating that forwarding voice information from other users is prohibited to the sending user.

4. The method according to claim 2, wherein
the step of determining, by the first terminal device, whether the voice information is voice information inputted by the sending user, comprising:
determining, by the first terminal device, whether the voice information is voice information inputted by the sending user according to an information generator parameter carried in the voice information.

5. The method according to claim 2, wherein
the method further comprising:
before determining whether the voice information is voice information inputted by the sending user, determining, by the first terminal device, whether voice forwarding function is on, and if yes, further determining whether the voice information is voice information inputted by the sending user.

6. The method according to claim 1, wherein
the step of acquiring the voice information to be forwarded and the receiving user which are selected by the sending user, comprising:
receiving, by an instant messaging (IM) platform, the voice information to be forwarded and the receiving user, which are selected by the sending user and are sent by the first terminal device, wherein the first terminal device is a terminal device used by the sending user;
the step of in response to determining that the voice information is voice information inputted by the sending user, forwarding the voice information to the receiving user, comprising:
determining, by the IM platform, whether the voice information is voice information inputted by the sending user;
if yes, sending the voice information to the receiving user.

7. The method according to claim 6, wherein
the method further comprising:
in response to determining by the IM platform that the voice information is not voice information inputted by the sending user, returning prompt information indicating that forwarding voice information of other users is prohibited to the first terminal device so that the first terminal device feedbacks the prompt information to the sending user.

8. The method according to claim 6, wherein
the step of determining, by the IM platform, whether the voice information is voice information inputted by the sending user, comprising:
determining, by the IM platform, whether the voice information is voice information inputted by the sending user according to an information generator parameter carried in the voice information.

9. The method according to claim 6, wherein
the method further comprising:
before sending the voice information to be forwarded and the receiving user which are selected by the sending user to the IM platform, determining, by the first terminal device, whether the voice forwarding function is on, and if yes, sending the voice information to be forwarded and the receiving user which are selected by the sending user to the IM platform.

10. The method according to claim 1, wherein
the method further comprising:
receiving, by a second terminal device used by the receiving user, the voice information and presenting the voice information in a chat window of the receiving user with the sending user.

11. A computer device, comprising a memory, a processor and computer programs stored on the memory and executable on the processor, wherein the computer programs, when executed by the processor, implement the method as recited in claim 1.

12. A computer readable storage medium storing computer programs thereon, wherein the computer programs, when executed by a processor, implement the method as recited in claim 1.

* * * * *